(12) United States Patent
Kwon

(10) Patent No.: US 10,956,012 B2
(45) Date of Patent: Mar. 23, 2021

(54) DISPLAY APPARATUS WITH A USER INTERFACE TO CONTROL ELECTRONIC DEVICES IN INTERNET OF THINGS (IOT) ENVIRONMENT AND METHOD THEREOF

(71) Applicant: SAMSUNG ELECTRONICS CO., LTD., Suwon-si (KR)

(72) Inventor: Oh-in Kwon, Seoul (KR)

(73) Assignee: SAMSUNG ELECTRONIC CO., LTD., Suwon-si (KR)

(*) Notice: Subject to any disclaimer, the term of this patent is extended or adjusted under 35 U.S.C. 154(b) by 40 days.

(21) Appl. No.: 15/419,477

(22) Filed: Jan. 30, 2017

(65) Prior Publication Data

US 2017/0220236 A1 Aug. 3, 2017

(30) Foreign Application Priority Data

Feb. 1, 2016 (KR) .................. 10-2016-0012432

(51) Int. Cl.
*G06F 3/0484* (2013.01)
*H04N 21/485* (2011.01)
(Continued)

(52) U.S. Cl.
CPC ........ *G06F 3/04847* (2013.01); *G06F 3/0482* (2013.01); *G06F 3/04817* (2013.01); *G06F 3/1423* (2013.01); *H04L 12/4625* (2013.01); *H04N 21/4131* (2013.01); *H04N 21/4227* (2013.01); *H04N 21/42202* (2013.01);
(Continued)

(58) Field of Classification Search
CPC ............. G06F 3/04847; G06F 3/04817; G06F 3/1423; G06F 3/0482; G06F 3/048; H04N 21/4516; H04N 21/43615; H04N 21/4312; H04N 21/4227; H04N 21/485;
(Continued)

(56) References Cited

U.S. PATENT DOCUMENTS 10,120,354 B1 * 11/2018 Rolston .............. H04L 12/2816
2005/0022110 A1    1/2005 Humpleman et al.
(Continued)

OTHER PUBLICATIONS

Extended European Search Report dated Jun. 30, 2017 in corresponding European Patent Application No. 17153915.8.
(Continued)

*Primary Examiner* — Jeanette J Parker
(74) *Attorney, Agent, or Firm* — Staas & Halsey LLP

(57) ABSTRACT

A display apparatus and a control method thereof are provided. The display apparatus includes a display; a communicator configured to communicate with a plurality of electronic devices, which generates information used in a function of user device, via a network; a user input receiver configured to receive a user input; and a processor configured to display a graphic user interface (GUI) including a plurality of icons corresponding to the plurality of electronic devices, respectively, on the display, and to, based on a user input on at least one icon from among the plurality of icons, control an operation of corresponding at least one electronic device from among the plurality of electronic devices. The display apparatus provides the GUI for controlling the plurality of electronic devices, thereby enabling a user to control the electronic devices in an intuitive and convenient way.

20 Claims, 13 Drawing Sheets

(51) Int. Cl.
*H04N 21/436* (2011.01)
*H04N 21/45* (2011.01)
*H04N 21/4227* (2011.01)
*H04N 21/488* (2011.01)
*H04N 21/41* (2011.01)
*H04N 21/431* (2011.01)
*H04N 21/422* (2011.01)
*H04L 12/46* (2006.01)
*G06F 3/0481* (2013.01)
*G06F 3/0482* (2013.01)
*G06F 3/14* (2006.01)

(52) U.S. Cl.
CPC ... *H04N 21/4312* (2013.01); *H04N 21/43615* (2013.01); *H04N 21/4516* (2013.01); *H04N 21/485* (2013.01); *H04N 21/488* (2013.01)

(58) Field of Classification Search
CPC ............. H04N 21/4131; H04N 21/488; H04N 21/42202; H04L 12/4625
See application file for complete search history.

(56) References Cited

U.S. PATENT DOCUMENTS

| | | | | |
|---|---|---|---|---|
| 2014/0068486 A1* | 3/2014 | Sellers | ................ | G06F 3/04847 715/771 |
| 2014/0108943 A1 | 4/2014 | Lee et al. | | |
| 2014/0269614 A1 | 9/2014 | Maguire et al. | | |
| 2014/0351790 A1 | 11/2014 | Ghose et al. | | |
| 2015/0019710 A1* | 1/2015 | Shaashua | ................ | H04W 4/70 709/224 |
| 2015/0350031 A1* | 12/2015 | Burks | ..................... | H04L 41/22 715/736 |
| 2016/0128124 A1* | 5/2016 | Liu | ....................... | H04W 76/14 709/204 |
| 2017/0086014 A1* | 3/2017 | Hwang | ................. | H04W 4/008 |
| 2017/0185383 A1* | 6/2017 | Sarkar | ................. | G06F 3/04842 |

OTHER PUBLICATIONS

European Office Action dated Dec. 22, 2017 in European Patent Application No. 17153915.8.
European Communication dated Aug. 3, 2018 in European Patent Application No. 17153915.8.
European Office Communication dated Apr. 8, 2019 in European Patent Application No. 171539158.
Chinese Office Action dated Sep. 3, 2019 in related Chinese Application No. 201710057322.3.
European Office Action dated Nov. 29, 2019 in related European Application No. 17153915.8.
Chinese Office Action dated Apr. 10, 2020 from Chinese Patent Application No. 201710057322.3, 17 pages.
Chinese Office Action dated Aug. 21, 2020 from Chinese Application No. 201710057322.3, 18 pages.

* cited by examiner

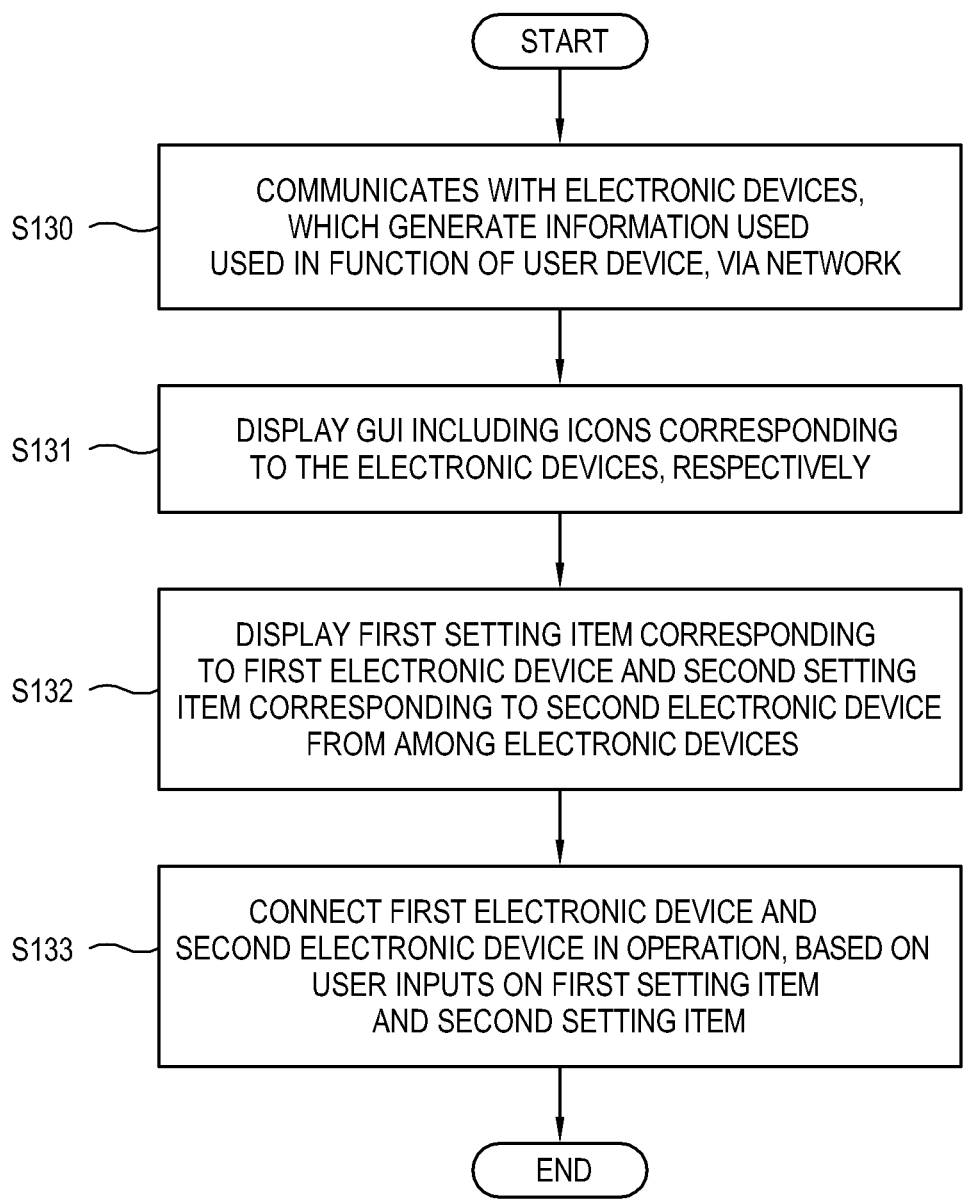

DISPLAY APPARATUS WITH A USER INTERFACE TO CONTROL ELECTRONIC DEVICES IN INTERNET OF THINGS (IOT) ENVIRONMENT AND METHOD THEREOF

CROSS-REFERENCE TO RELATED APPLICATIONS

This application claims foreign priority from Korean Patent Application No. 10-2016-0012432, filed on Feb. 1, 2016 in the Korean Intellectual Property Office, the disclosure of which is incorporated herein in its entirety by reference.

BACKGROUND

1. Field

Apparatuses and methods consistent with exemplary embodiments relate to a display apparatus and a control method thereof, and more particularly to a display apparatus and a control method thereof, which use a user interface to control electronic devices at internet of things (IoT) environment.

2. Description of the Related Art

In the IoT environment, to set up or test many devices having complicated and various functions from simple sensors and controllers to smart devices, automobiles, robots and the like, a user has to check states of respective devices and directly or indirectly manipulate the respective devices by device. Also, it is ineffective in that the respective devices can be controlled only by unique applications and interfaces, which are provided together therewith.

User experiences, which allows the user to intuitively and conveniently set up, test, program, maintain and repair operations of the respective devices in the IoT environment, are also insufficient.

Accordingly, it is need to provide the user experiences to what services or functions are necessary for the user, what manipulations are most useful for the user, and the like, to control the many devices.

SUMMARY

Exemplary embodiments address at least the above problems and/or disadvantages and other disadvantages not described above. Also, the exemplary embodiments are not required to overcome the disadvantages described above, and may not overcome any of the problems described above.

The exemplary embodiments may provide a display apparatus and a control method thereof, which use a user interface to control electronic devices.

Also, the exemplary embodiments may provide a display apparatus and a control method thereof, which set up, test, program, maintain and repair operations of electronic devices in an intuitive and convenient way.

According to an aspect of an exemplary embodiment, there is provided a display apparatus including: a display; a communicator configured to communicate with a plurality of electronic devices, which generates information used in a function of a user device, via a network; a user input receiver configured to receive a user input; and a processor configured to display a graphic user interface (GUI) including a plurality of icons corresponding to the plurality of electronic devices, respectively, on the display, and to, based on a user input on at least one icon from among the plurality of icons, control an operation of corresponding at least one electronic device from among the plurality of electronic devices.

According to the exemplary embodiment, the display apparatus may provide the GUI for controlling the plurality of electronic devices, thereby enabling a user to control the electronic devices in an intuitive and convenient way.

The processor may be configured to display the at least one icon corresponding to the at least one electronic device in response to the at least one electronic device being paired via the communicator. Accordingly, the display apparatus, such a television (TV), may display the at least one electronic device paired therewith on the GUI, thereby enabling the user to directly control the at least one electronic device.

The processor may be configured to receive device information from at least one electronic device from among the plurality of electronic devices via the communicator, and to display an image corresponding to the at least one icon based on the received device information. For this reason, the display apparatus may display the image of the at least one electronic device paired therewith, thereby enabling the user to intuitively identify the paired at least one electronic device.

The processor may be configured to display a control item capable of setting up at least one operation of the at least one electronic device, and to set up the at least one operation of the at least one electronic device according to a user input on the control item. With this, the display apparatus may display the item capable of being set up to the at least one electronic device paired therewith, thereby enabling the user to set up or test the at least one operation of the paired at least one electronic device.

The control item may be displayed based on device information received from the at least one electronic device via the communicator. According to this, the display apparatus may provide the control item to the at least one electronic device, based on meta information received from the at least one electronic device.

The processor may be configured to, based on user inputs on a first control item corresponding to a first electronic device and a second control item corresponding to a second electronic device from among the plurality of electronic devices, connect the first electronic device and the second electronic device in operation. Accordingly, the display apparatus may connect the electronic devices in operation by selecting the control items of the plurality of electronic device displayed on the GUI.

The processor may be configured to receive state information from the at least one electronic device during which the at least one operation is set up via the communicator, and to display information on result state of the setting based on the received state information. With this, the display apparatus may provide the user the state and result on the at least one operation of the at least one electronic device set up via the GUI.

The GUI may further include an image indicating places in which the plurality of electronic devices is provided, and the plurality of icons corresponding to the plurality of electronic devices, respectively, may be placed at positions in which the plurality of electronic devices is respectively provided on the image. Accordingly, the display apparatus may display an image map indicating the places on the GUI and indicate the positions of the plurality of electronic devices on the image map, thereby helping the user to understand the positions of the plurality of electronic devices and enabling the user to intuitively connect the plurality of electronic devices in operation.

At least a portion of the image may be generated or changed according a user input. Accordingly, when directly drawing or changing the image map indicating the places, the user may display the paired at least one electronic device on the image map that the user wants.

According to an aspect of another exemplary embodiment, there is provided a control method of a display apparatus including: communicating a plurality of electronic devices, which generates information used in a function of a user device, via a network; displaying a GUI including a plurality of icons corresponding to the plurality of electronic devices, respectively; and based on a user input on at least one icon from among the plurality of icons, controlling an operation of corresponding at least one electronic device from among the plurality of electronic devices.

According to the exemplary embodiment, the display apparatus may provide the GUI for controlling the plurality of electronic devices, thereby enabling a user to control the electronic devices in an intuitive and convenient way.

The method may further include displaying the at least one icon corresponding to the at least one electronic device in response to the at least one electronic device being paired via the communicator. Accordingly, the display apparatus, such a TV, may display the at least one electronic device paired therewith on the GUI, thereby enabling the user to directly control the at least one electronic device.

The method may further include receiving device information from at least one electronic device from among the plurality of electronic devices via the communicator, and displaying an image corresponding to the at least one icon based on the received device information. For this reason, the display apparatus may display the image of the at least one electronic device paired therewith, thereby enabling the user to intuitively identify the paired at least one electronic device.

The method may further include displaying a control item capable of setting up at least one operation of the at least one electronic device, and setting up the at least one operation of the at least one electronic device according to a user input on the control item. With this, the display apparatus may display the item capable of being set up to the at least one electronic device paired therewith, thereby enabling the user to set up or test the at least one operation of the paired at least one electronic device.

The control item may be displayed based on device information received from the at least one electronic device via the communicator. According to this, the display apparatus may provide the control item to the at least one electronic device, based on meta information received from the at least one electronic device.

The method may further include, based on user inputs on a first control item corresponding to a first electronic device and a second control item corresponding to a second electronic device from among the plurality of electronic devices, connecting the first electronic device and the second electronic device in operation. Accordingly, the display apparatus may connect the electronic devices in operation by selecting the control items of the plurality of electronic device displayed on the GUI.

The method may further include receiving state information from the at least one electronic device during which the at least one operation is set up via the communicator, and displaying information on result state of the setting based on the received state information. With this, the display apparatus may provide the user the state and result on the at least one operation of the at least one electronic device set up via the GUI.

The GUI may further includes an image indicating places in which the plurality of electronic devices is provided, and the plurality of icons corresponding to the plurality of electronic devices, respectively, may be placed at positions in which the plurality of electronic devices is respectively provided on the image. Accordingly, the display apparatus may display an image map indicating the places on the GUI and indicate the positions of the plurality of electronic devices on the image map, thereby helping the user to understand the positions of the plurality of electronic devices and enabling the user to intuitively connect the plurality of electronic devices in operation.

At least a portion of the image may be generated or changed according a user input. Accordingly, when directly drawing or changing the image map indicating the places, the user may display the paired at least one electronic device on the image map that the user wants.

As described above, according to the exemplary embodiments, the display apparatus may provide the GUI for controlling the plurality of electronic devices, thereby enabling the user to control the electronic devices in the intuitive and convenient way.

Also, according to the exemplary embodiments, the display apparatus may enable the user to set up, test, program, maintain and repair operations of the electronic devices in the intuitive and convenient way.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 is a flow chart illustrating a control method of a display apparatus according to an exemplary embodiment.

Throughout the drawings, like reference numerals will be understood to refer to like parts, components, and structures.

DETAILED DESCRIPTION

Figure 1:
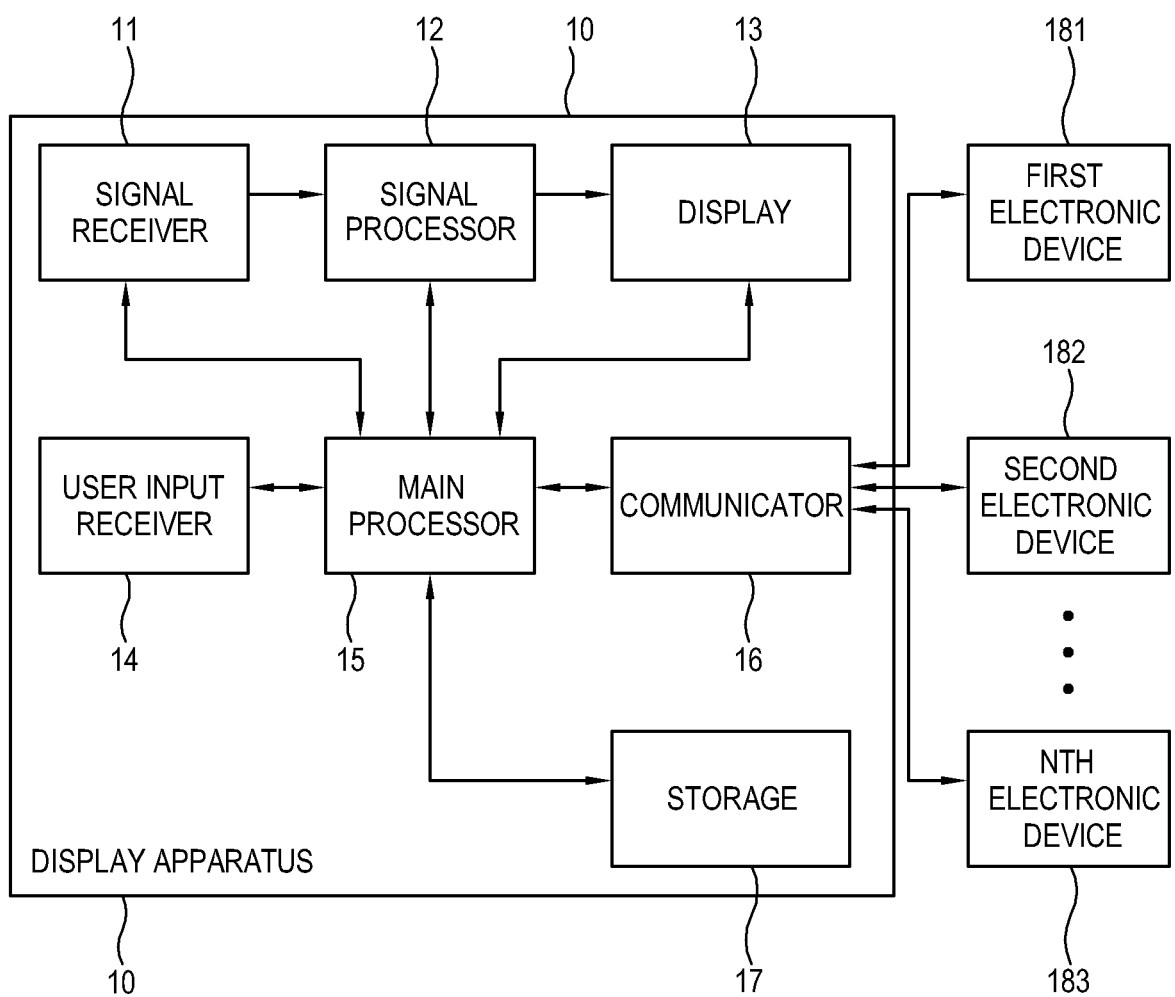
FIG. 1 is a block diagram illustrating a construction of a display apparatus according to an exemplary embodiment.

With reference to accompanying drawings, exemplary embodiments will be described in detail for those skilled in the art to work the present disclosure without difficulty. The exemplary embodiments may be achieved in various forms, and are not limited to the embodiments provided herein. To clearly describe the exemplary embodiments, those unrelated to the description have been omitted, and like reference numerals denote like elements throughout this specification.

Hereinafter, a display apparatus according to an exemplary embodiment will be described in details through FIG. 1. FIG. 1 is a block diagram illustrating a construction of the display apparatus according to an exemplary embodiment. As illustrated in FIG. 1, the display apparatus 10 according to an exemplary embodiment includes a signal receiver 11, a signal processor 12, a display 13, a user input receiver 14, a main processor 15, a communicator 16, and a storage 17. The display apparatus 10 according to an exemplary embodiment may be implemented, for example, as a smart television (TV), a smart phone, a tablet personal computer, a computer, a notebook computer, etc.

The display apparatus 10 may be connected with a first electronic device 181, a second electronic device 182, . . . , and an Nth electronic device 183, using a communication protocol, such as wireless fidelity (W-Fi), Bluetooth (BT), Zigbee and so on. The first to Nth electronic devices 181 to 183 may be implemented, for example, as sensors, such as a door sensor, a temperature sensor, a motion sensor, etc. The first to Nth electronic devices 181 to 183 as another example may be implemented as electronic goods, such as a smart TV, a smart phone, an air conditioner, a washing machine, a robot cleaner, a light switch, a temperature control, etc. The types of the first to Nth electronic devices 181 to 183 are not limited thereto, but may be implemented by various kinds of electronic devices capable of being used in the internet of things (IoT) environment. The components included in the display apparatus 10 are also not limited to the exemplary embodiment described above, but may be implemented as including other additional components.

The display apparatus 10 communicates with the plurality of electronic devices 181 to 183, which generate information used in a function of a user device, via the network. The display apparatus 10 displays a graphic user interface (GUI), which includes a plurality of icons corresponding to the plurality of electronic devices 181 to 183, respectively. Based on a user input on at least one icon from among the plurality of icons, the display apparatus 10 controls an operation of corresponding at least one electronic device from among the plurality of electronic devices 181 to 183.

According to the exemplary embodiment, the display apparatus provides the GUI for controlling the plurality of electronic devices. Therefore, a user may control the electronic devices in an intuitive and convenient way. Also, the user may set up, test, program, maintain and repair operations of the electronic devices in the intuitive and convenient way.

The signal receiver 11 receives a broadcasting signal or an image signal. The signal receiver 11 may be provided in various forms according to standards of the received broadcasting or image signals and implemented types of the display apparatus 10. For instance, the signal receiver 11 may be implemented as a tuner, which receives a radio frequency (RF) broadcasting signal or a satellite signal transmitted from a broadcasting station. The signal receiver 11 as another example may receive an image signal from external devices, such as a digital versatile disc (DVD) player, a universal serial bus (USB) device and the like, which are connected with the display apparatus 10. As this time, the signal receiver 11 is also not limited to the exemplary embodiment described above, but may receive the broadcasting signal or the image signal in various forms.

The signal processor 12 performs a predetermined signal processing to the broadcasting signal or the image signal received from the signal receiver 11. Examples of the signal processing, which are performed by the signal processor 12, are decoding, de-interlacing, scaling, noise reduction, detail enhancement, etc. and the types thereof are not limited thereto. The signal processor 12 may be implemented by a system-on-chip (SOC) in which various functions as described above are integrated or an image processing board on which individual components capable of separately performing each process are mounted.

The display 13 displays an image based on the broadcasting signal or the image signal processed by the signal processor 12. Implemented types of the display 13 are not limited, and the display 13 may be implemented in various forms, such as plasma display panel (PDP), liquid crystal display (LCD), organic light emitting diodes (OLED), flexible display, etc.

The user input receiver 14 receives a user input for controlling at least one function of the display apparatus 10. As an example, the user input receiver 14 may be implemented as a keyboard, a mouse and the like, which are connected with the display apparatus 10, and also in a form of an input panel provided on an outside of the display apparatus 10. The user input receiver 14 as another example may include a touch screen provided on the display apparatus 10. The touch screen may be configured to detect a touched position, a touched area and a touch input. Also, the touch screen may be configured to detect a proximity touch as well as a real touch. Here, the real touch means a case that a body (for example, a finger) of the user or a touch pen (for example, a pointing device, a stylus, a haptic, an electronic pen, etc.) provided as a touch tool is actually touched on the screen. Also, the proximity touch means a case that the body of the user or the touch pen is not actually touched on the screen, but is approached a preset distance away from the screen (for example, a case that a detectable distance is less than 30 mm).

The communicator 16 communicates with external devices. The communicator 16 communicates with a plurality of electronic devices, which generate information used in a function of a user device, via the network. The user device may be implemented, for example, as a smart phone, a smart TV, a smart watch, a tablet PC, and the like, and the plurality of electronic devices may provide information on operations of the electronic devices to the user device via the network in the IoT environment.

The communicator 16 may be connected with the first to Nth electronic devices 181 to 183 using a communication protocol, such as BT, Zigbee, 6 low power wireless personal area network (6LoWPAN) and so on. If communicating with the first to Nth electronic devices 181 to 183 via the BT, the communicator 16 is paired with at least one of the first to Nth electronic devices 181 to 183 to connect therewith. For instance, the communicator 16 may receive a request for pairing from at least one of the first to Nth electronic devices 181 to 183, and recognize the received request to permit a connection therewith. At this time, to permit the connection with the at least one of the first to Nth electronic devices 181 to 183, the communicator 16 may receive an input, such as a password and the like, from the user via the user input receiver 14.

As another example, the communicator 16 may retrieve at least one connectable device from among the first to Nth electronic devices 181 to 183, and connect with the at least one connectable device via the W-Fi.

The main processor 15 generates a graphic user interface (GUI) screen based on an image which is stored in the at least one memory and is set to be used for the GUI and a plurality of icons corresponding to the plurality of electronic devices, respectively. The main processor 15 displays the generated GUI on the display. In response to a user input for selecting an icon among the plurality of icons, the main processor 15 displays a control item for controlling an operation of an electronic device corresponding to the selected icon. In response to a user input for selecting the control item, transmit a signal, associated with the control item, to the electronic device corresponding to the control item via the communicator to control an operation of the electronic device.

The main processor 15 displays on the display 13 a GUI, which includes a plurality of icons corresponding to the plurality of electronic devices, that is, the first to Nth electronic devices 181 to 183, respectively. Here, the GUI may include an image, which indicates places on which the plurality of electronic devices is provided. For instance, the image, which is displayed on the display 13, may be implemented as an image map in the form of a house in which pre-stored component images, such as rooms, doors, windows, balconies, entrances and the like, are combined and generated. Also, at least a portion of the image may be created or changed according a user input. As an example, with a touch input or mouse manipulation, the user may change or delete at least a portion of the component images in the image map in the form of the house and/or positions thereof, and add new component images into the image map. As another example, the image map in the form of the house is not generated by combining the pre-stored component images, but may be created in such a manner that the user directly draws the image map using an image production program or application.

In an exemplary embodiment, the main processor 15 may display at least one icon corresponding to at least one of the first to Nth electronic devices 181 to 183 in response to the at least one electronic device being paired via the communicator 16. For instance, the user may perform an operation of inputting a pairing request, such as pressing a pairing button, at least one electronic device from among the first to Nth electronic devices 181 to 183. At this time, the display apparatus 10 may recognize a pairing request signal and let the user to determine whether she or he permits an connection with the at least one electronic device into which the pairing request is inputted. As an example, to connect with the at least one electronic device into which the pairing request is inputted, the display apparatus 10 may perform a user authentication, such as receiving a password from the user or the like.

With this, if being paired with the at least one of the first to Nth electronic devices 181 to 183, the display apparatus 10 may generate and display at least one icon corresponding to the paired at least one electronic device.

The icons corresponding to the first to Nth electronic devices 181 to 183 may be displayed on the image map in the form of the house. With a user manipulation, the icons may be changed in position and placed at the changed position.

In an exemplary embodiment, the main processor 15 may receive device information from the at least one electronic device from among the plurality of electronic devices 181 to 183 via the communicator 16, and display the at least one icon based on the received device information. For instance, if the display apparatus 10 is paired with the at least one of the first to Nth electronic devices 181 to 183, the main processor 15 may request and receive meta information on the paired at least one electronic device thereto and therefrom, and download an image corresponding to the paired at least one electronic device from a server (not shown) to display with the at least one icon, based on the meta information. With this, the display apparatus 10 may display the image of the paired at least one electronic device to allow the user to visually identify the paired at least one electronic device.

In an exemplary embodiment, the main processor 15 may select the image a plurality of images stored in the memory to generate the GUI screen for a mode of internet of things (IOT). The main processor 15 may generate the GUI screen for the mode of IOT by incorporating the selected image and the plurality of icons.

In an exemplary embodiment, the main processor 15 may acquire an image of the icon through an internet search based on an identification information of the electronic device.

In an exemplary embodiment, the main processor 15 may move at least one icons among the plurality of icons in the GUI screen for the mode of IOT by a user command, and in response to a command for storing after moving of the at least one icons, may store the GUI screen for the mode of IOT.

In an exemplary embodiment, the main processor 15 may display a control item capable of setting up an operation of at least one of the first to Nth electronic devices 181 to 183, and set up the operation of the at least one electronic device according to a user input on the control item. At this time, the control item may be displayed based on information received from the corresponding electronic device via the communicator 16. For instance, if the display apparatus 10 is paired with the at least one of the first to Nth electronic devices 181 to 183, the main processor 15 may receive from the at least one electronic device, meta information, which includes a list of operation application programming interfaces (APIs) to which the at least one electronic device support. With this, the display apparatus 10 may display operations performable by the at least one electronic device, based on the meta information, via a menu and the user may select one from among the displayed operations to set up the operation of the at least one electronic device. As an example, by setting up a sensing event API, which informs the user of whether or not other devices are approached to a proximity sensor, the display apparatus 10 may receive and display information on whether or not the other devices are approached.

In an exemplary embodiment, the main processor 15 may connect a first electronic device 181 and a second electronic device 182 from among the plurality of electronic devices 181 to 183 in operation, based on user inputs on a first control item corresponding to the first electronic device 181 and a second control item corresponding to the second electronic device 182. For instance, if the display apparatus 10 is paired with the first electronic device 181 and the second electronic device 182, the main processor 15 may receive meta information including a list of supportable operation APIs from each of the first electronic device 181 and the second electronic device 182. At this time, the display apparatus 10 may display operations, which are supported by the first electronic device 181 and the second electronic device 182, as the first control item and the second control item, based on the received meta information from the first electronic device 181 and the second electronic device 182, respectively. The user may connect a first operation of the first electronic device 181 and a second operation of the second electronic device 182 by selecting the first operation supported by the first electronic device 181 from among operations in the displayed first control item, and selecting the second operation supported by the second electronic device 182 from among operations in the displayed second control item.

In an exemplary embodiment, the main processor 15 may receive state information from the electronic device during which the operation is controlled from among the first to Nth electronic devices 181 to 183, via the communicator 16 and display information on result state of the operation based on the received state information. For instance, if the user set up the operation through the control item of the at least one electronic device, the main processor 15 may receive information on state or result with respect to whether the at least one electronic device performs the set-up operation and display the received information on the display 13.

In an exemplary embodiment, the main processor 15 may include a control program for controlling to perform the control operation as described above, a non-volatile memory in which the control program is installed, a volatile memory in which at least one of the control program is loaded, and at least one microprocessor for executing the loaded control program. The control program may include a program (or programs) which is implemented in the form of at least one of a BIOS, a device driver, an operating system, a firmware, a platform, and an application program (application). According to an exemplary embodiment, the application program may be installed or stored in advance in the display apparatus 10 in manufacturing, or installed in the display apparatus 10 based data received from an external apparatus in use. The external apparatus as a recording medium executable by a computer may be a recording medium in which the data of the application program is stored. According to another exemplary embodiment, the external apparatus may be a network server and the data of the application program may be downloaded from the network server, for example, an application market or the like. In this case, the network server may provide the data of the application program stored in the recording medium, to the display apparatus 10.

The storage 17 may store connection information with at least one electronic device which is previously connected with the display apparatus 10. The connection information may include information for pairing with the at least one electronic device from among the plurality of electronic devices 181 to 183 when the display apparatus 10 communicates with the at least one electronic device, for example, via the BT. According to an exemplary embodiment, the storage 17 may store device information received from at least one electronic device from among the plurality of electronic devices 181 to 183. At this time, the storage 17 may also store an image of the at least one electronic device received from the server, based on the device information. According to another exemplary embodiment, the storage 17 may store information on the control item, which is displayed based device information received from at least one electronic device from among the plurality of electronic devices 181 to 183.

Figure 2:
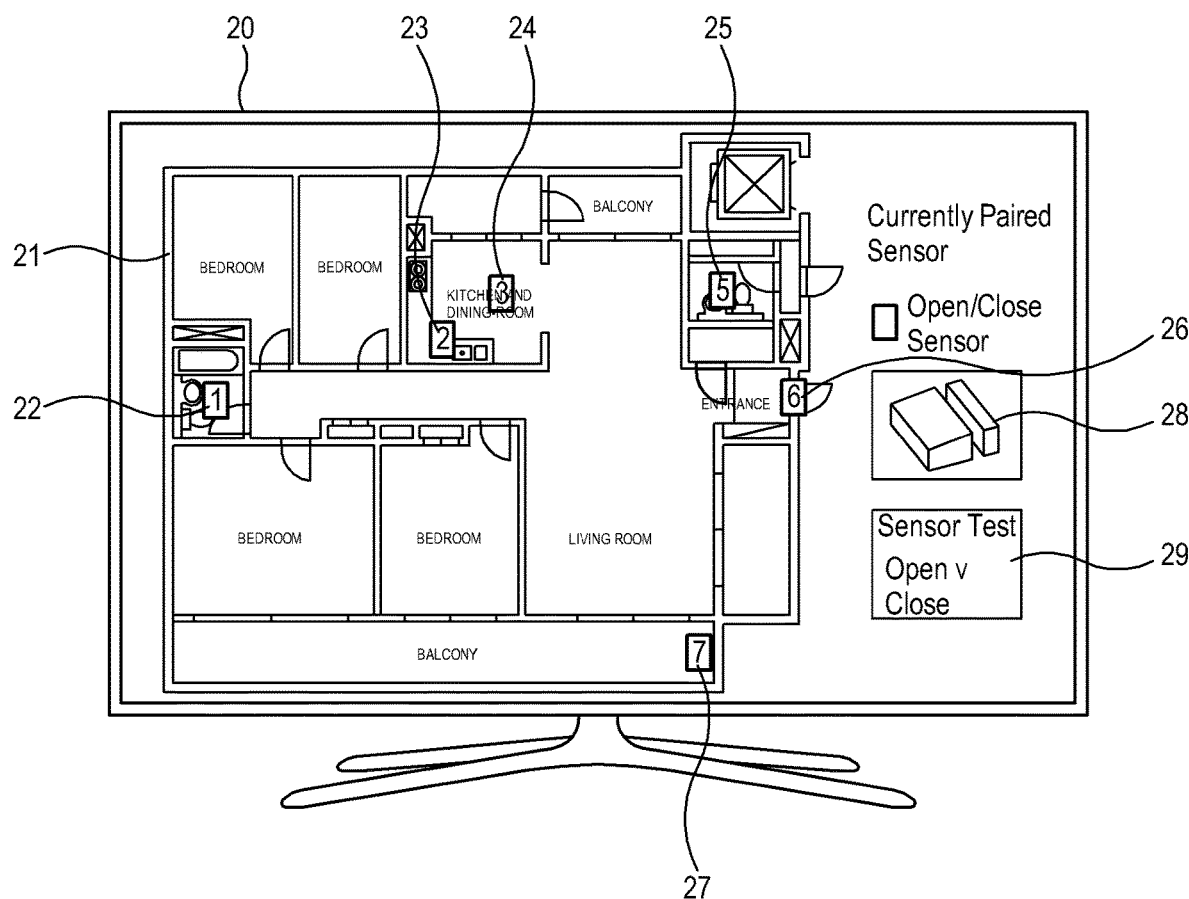
FIG. 2 illustrates an example of displaying icons of paired electronic devices on a graphic user interface (GUI) according to an exemplary embodiment.

FIG. 2 illustrates an example of displaying icons of paired electronic devices on the GUI according to an exemplary embodiment. As illustrated in FIG. 2, a TV 20 may display an image map 21, which indicates the internal structure of a house, on the screen, and display a plurality of electronic devices paired with the TV 20 as icons 22 to 27 on the displayed image map 21. As an example, if being paired with at least one of the plurality of electronic devices, the TV 20 may display icons 22 to 27 corresponding to the paired at least one electronic device on the screen. As another example, the TV 20 may display all icons 22 to 27 corresponding to at least one electronic device which has been previously paired with the TV 20, and indicate a paired state with a preset color or the like in regard to an icon 26 of a door sensor currently paired with the TV 20 from among the displayed icons 22 to 27.

In an exemplary embodiment, the TV 20 may display a picture image 28 and current state information 29 of the currently paired door sensor in regard to the icon 26 thereof. In other words, to allow the user to find out a type of the paired door sensor, the TV 20 may display the picture image 28 of the door sensor provided from a server of a manufacturer therefor or a web server. Also, to allow the user to find out a currently operated state of the paired door sensor, the TV 20 may receive the state information 29 related to whether the door is opened or closed from the door sensor and display the state information 29 on the screen.

Figure 3:
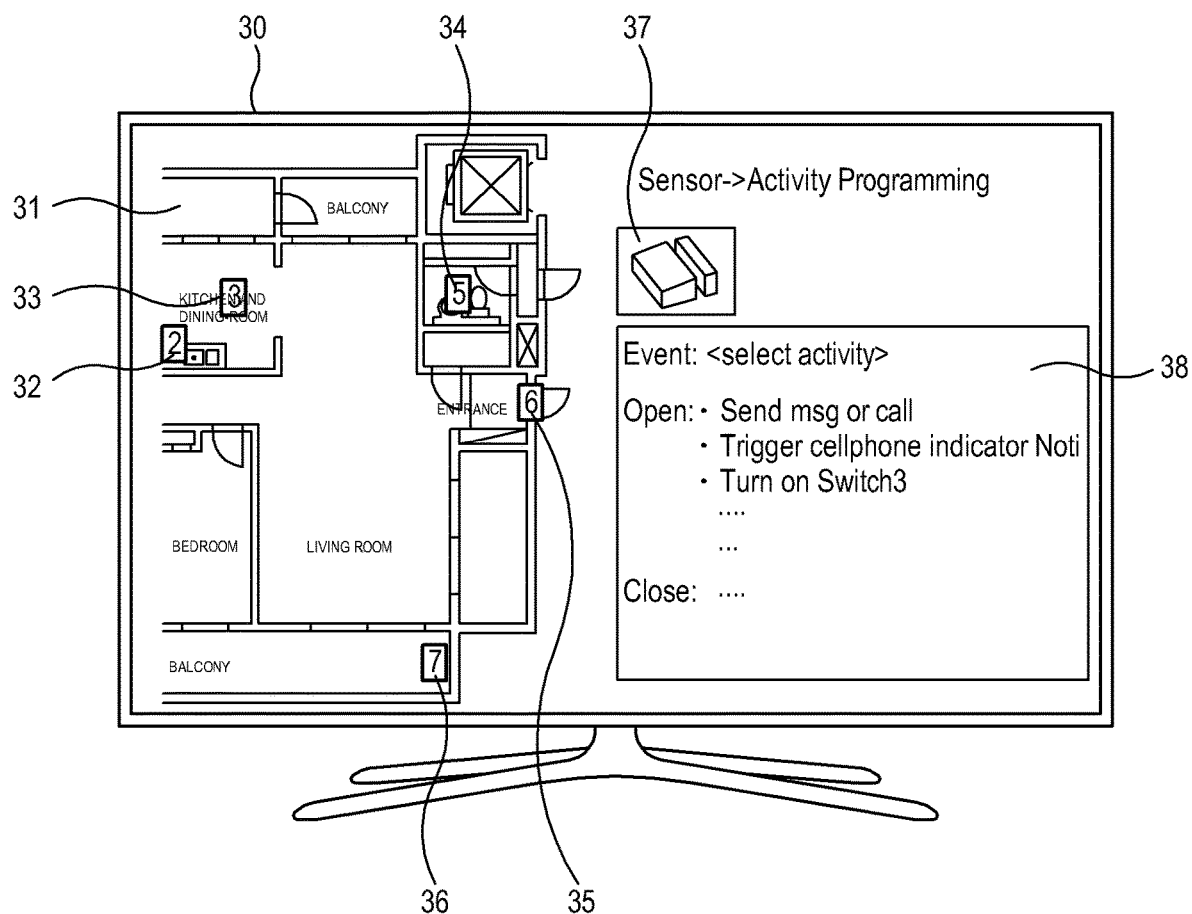
FIG. 3 illustrates an example of setting up an operation corresponding to an event of an electronic device according to an exemplary embodiment.

FIG. 3 illustrates an example of setting up an operation corresponding to an event of an electronic device according to an exemplary embodiment. As illustrated in FIG. 3, a TV 30 may display an image map 31, which indicates the internal structure of a house, on the screen, and display a plurality of electronic devices, which has been previously paired with the TV 30, as icons 32 to 36 on the displayed image map 31. As an example, the TV 30 may indicate a paired state with a preset color or the like in regard to an icon 35 of a door sensor currently paired with the TV 30 from among the plurality of displayed icons 32 to 36. Also, the icons 32 to 36 displayed on the image map 31 may be placed at positions that the user wants, respectively, by user inputs. In other words, the user may place the icons 32 to 36 in consideration of real positions of the corresponding electronic devices, thereby allowing the user to conveniently set up operations of the plurality of electronic devices. As another example, the user may delete a portion of the icons 32 and 36 displayed on the image map 31 or add an icon corresponding to a new electronic device into the image map 31 to display thereon.

In an exemplary embodiment, to enable the user to visually identify the paired door sensor, the TV 30 may display a picture or graphic image 37, which indicates a type of the door sensor, along with the icon 35 of the door sensor. At this time, the picture or graphic image 37 may be displayed based on device information received from the paired door sensor. As another example, the picture or graphic image 37 may be download from a server in which the picture or graphic image 37 is stored, based on the device information received from the paired door sensor and displayed on the TV In an exemplary embodiment, the TV 30 may display an activity control item corresponding to an event occurred in regard to the paired door sensor. As an example, if an event, such as 'a door open', is generated at the door sensor, the TV 30 may set up to transmit a message to a user terminal or to inform the user terminal of the event. Further, if the event, such as 'the door open', is generated at the door sensor, the TV 30 may set up to turn on a power switch of the house. Also, if an event, such as 'a door close', is generated at the door sensor, the TV 30 may set up to turn off the power switch and a boiler of the house.

As described above, according to the exemplary embodiment, the TV may display the icons of the paired electronic devices on the GUI and may be set up to perform the particular operations or control other electronic devices when the events are generated at the paired electronic devices.

Figure 4:
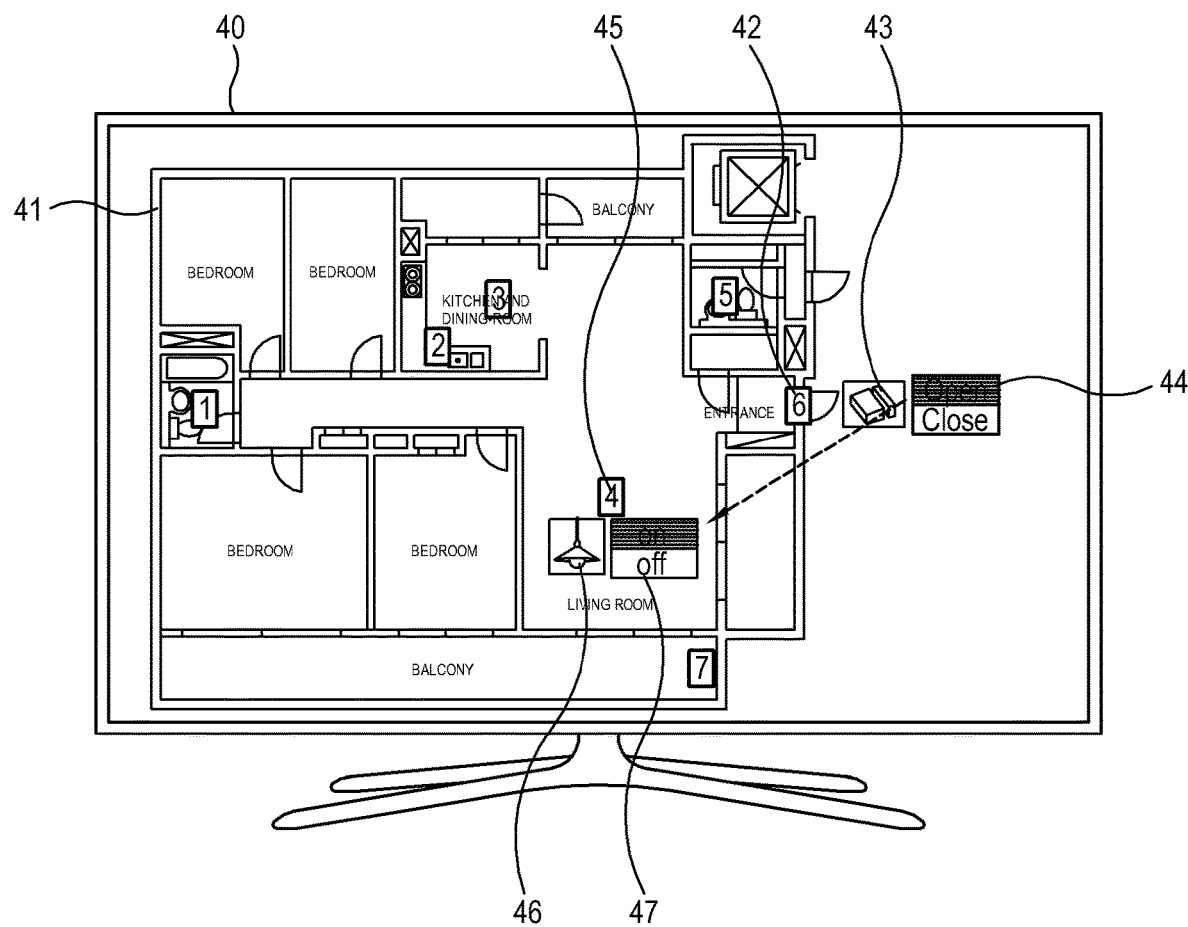
FIG. 4 illustrates an example of performing a setting for connecting electronic devices in operation according to an exemplary embodiment.

FIG. 4 illustrates an example of performing a setting for connecting electronic devices in operation according to an exemplary embodiment. As illustrated in FIG. 4, a TV 40 may display an image map 41, which indicates the internal structure of a house, on the screen, and display a plurality of electronic devices, which has been previously paired with the TV 40, as icons on the displayed image map 41. At this time, the TV 40 may indicate paired states with a preset color or the like in regard to icons 42 and 45 of a door sensor and a light switch for living room, which are currently paired with the TV 40 from among the plurality of icons displayed on the image map 41.

In an exemplary embodiment, the TV 40 may display pictures or graphic images 43 and 46, which indicate types of the door sensor and the light switch for living room, in regard to an icon 42 of the door sensor and an icon 45 of the light switch for living room, respectively. At this time, the pictures or graphic images 43 and 46 may be displayed based on device information received from the door sensor and the light switch for living room, which are paired with the TV 40. As another example, the pictures or graphic images 43 and 46 may be download from a server in which the pictures or graphic images 43 and 46 are stored, based on the device information received from the door sensor and the light switch for living room.

In an exemplary embodiment, the TV 40 may display a first control item 44 capable of setting up an operation of the door sensor and a second control item 47 capable of setting up an operation of the light switch for living room, in regard to the icons 42 and 45 of the door sensor and the light switch for living room, which are paired with the TV 40, respectively. As an example, the first control item 44 of the door sensor may include an 'open' item and a 'close' item, and the second control item 47 of the light switch for living room may include an 'on' item and an 'off' item.

In an exemplary embodiment, the TV 40 may connect the door sensor and the light switch for living room in operation, based on user inputs on the first control item 44 of the door sensor and the second control item 47 of the light switch for living room displayed on the image map TV 41. For instance, if the user selects the 'open' item of the first control item 44 and the 'on' item of the second control item 47 from among the items thereof, the TV 40 may be set up so that when a door open is detected at the door sensor, the light switch for living room is turned on. As another example, if the user connects the 'open' item of the first control item 44 and the 'on' item of the second control item 47 by a drag and drop method, the TV may be set up so that when the door open is detected at the door sensor, the light switch for living room is turned on.

As described above, according to the exemplary embodiment, the TV may display the icons of the plurality of paired electronic devices on the GUI and may be set up to connect the electronic devices that the user wants to control, in operation, by the user inputs on the icons of the plurality of paired electronic devices.

Figure 5:
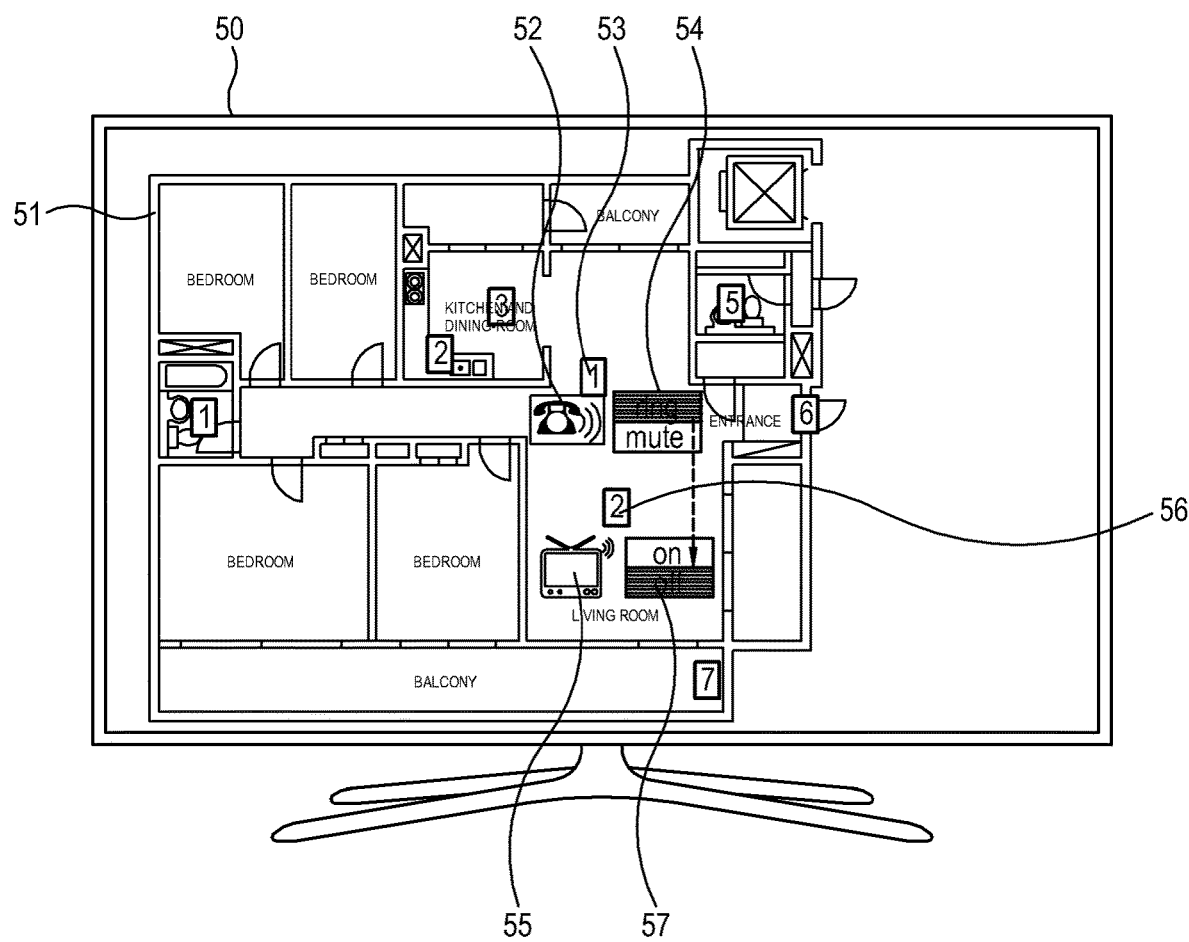
FIG. 5 illustrates an example of performing a setting for connecting electronic devices in operation according to an exemplary embodiment.

FIG. 5 illustrates an example of performing a setting for connecting electronic devices in operation according to an exemplary embodiment. As illustrated in FIG. 5, a TV 50 may display an image map 51, which indicates the internal structure of a house, on the screen, and display a plurality of electronic devices, which has been previously paired with the TV 50, as icons on the displayed image map 51. At this time, the TV 50 may indicate paired states with a preset color or the like in regard to icons 53 and 56 of a wireless telephone and the TV 50 itself, which are currently paired each other from among the plurality of icons displayed on the image map 51.

In an exemplary embodiment, the TV 50 may display pictures or graphic images 52 and 55, which indicate types of the wireless telephone and the TV 50, in regard to the icon 53 of the wireless telephone and the icon 56 of the TV 50, respectively. At this time, the pictures or graphic images 52 and 55 may be displayed based on device information received from the wireless telephone, which are paired with the TV 50, and device information stored in the TV 50. As another example, the pictures or graphic images 52 and 55 be download from a server in which the pictures or graphic images 52 and 55 are stored, based on the device information received from the wireless telephone and the device information stored in the TV 50.

In an exemplary embodiment, the TV 50 may display a first control item 54 capable of setting up an operation of the wireless telephone and a second control item 57 capable of setting up an operation of the TV 50, in regard to the icons 53 and 56 of the wireless telephone and the TV 50, which are paired with each other, respectively. As an example, the first control item 54 of the wireless telephone may include a 'ring' item and a 'mute' item, and the second control item 57 of the TV 50 may include an 'on' item and an 'off' item.

In an exemplary embodiment, the TV 50 may connect the wireless telephone and the TV 50 in operation, based on user inputs on the first control item 54 of the wireless telephone and the second control item 57 of the TV 50 displayed on the image map TV 51. As an example, if the user selects the 'ring' item of the first control item 54 and the 'off' item of the second control item 57 from among the items thereof, the TV 50 may be set up so that when there is a ring at the wireless telephone, the TV 50 is turned off or operated to temporary stop outputting the audio. As another example, if the user connects the 'ring' item of the first control item 54 and the 'off' item of the second control item 57 by a drag and drop method, the TV 50 may be set up so that when there is a ring at the wireless telephone, the TV 50 is turned off.

As described above, according to the exemplary embodiment, the TV may display the icons of the plurality of electronic devices and the TV itself, which are paired each other, on the GUI and may be set up to connect the electronic devices that the user wants to control and the TV in operation, by the user inputs on the icons of the plurality of electronic devices and the TV.

Figure 6:
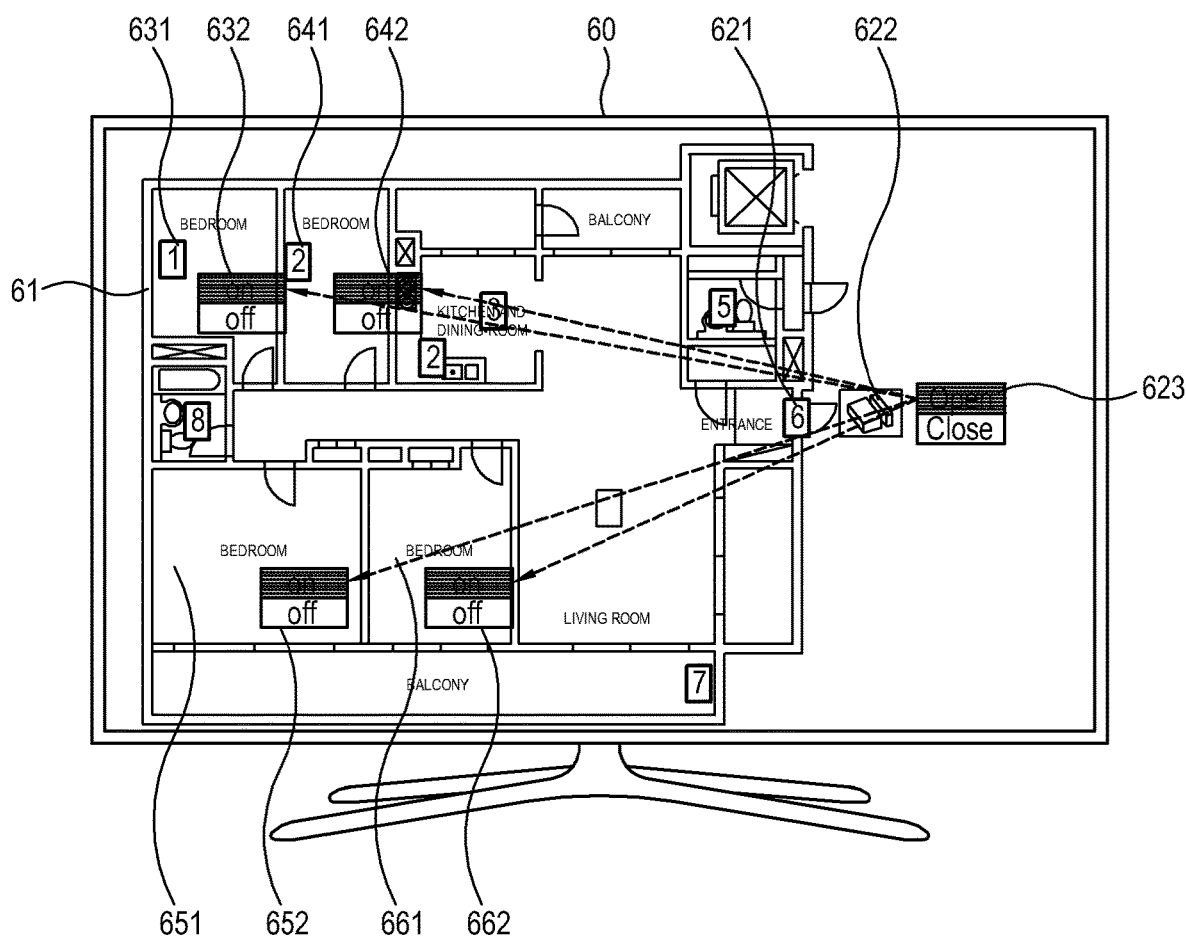
FIG. 6 illustrates an example of performing a setting for connecting electronic devices in operation according to an exemplary embodiment.

FIG. 6 illustrates an example of performing a setting for connecting electronic devices in operation according to an exemplary embodiment. As illustrate in FIG. 6, a TV 60 may display an image map 61, which indicates the internal structure of a house, on the screen, and display a plurality of electronic devices, which has been previously paired with the TV 60, as icons on the displayed image map 61. At this time, the TV 60 may indicate paired states with a preset color or the like in regard to icons 621, 631, 641, 651 and 661 of a door sensor, a first temperature sensor, a second temperature sensor, a third temperature sensor and a fourth temperature sensor, which are currently paired with the TV 60, from among the plurality of icons displayed on the image map 51. Also, the TV 60 may display pictures or graphic images, which indicate types of the door sensor and the first to fourth temperature sensors, together with the icons 621, 631, 641, 651 and 661 thereof.

In an exemplary embodiment, the TV 60 display a first control item 623 capable of setting up an operation of the door sensor and second control items 632, 642, 652 and 662 capable of setting up operations of the first to fourth temperature sensors, in regard to the icon 621 of the door sensor and the icons 631, 641, 651, and 661 of the first to fourth temperature sensors, respectively. As an example, the first control item 623 of the door sensor may include an 'open' item and a 'close' item, and the second control items 632, 642, 652 and 662 of the first to fourth temperature sensors may include an 'on' item and an 'off' item, respectively.

In an exemplary embodiment, the TV 60 may connect the door sensor and the first to fourth temperature sensors in operation, based on user inputs on the first control item 623 of the door sensor and the second control items 632, 642, 652 and 662 of the first to fourth temperature sensors displayed on the image map TV 61. As an example, if the user connects the 'open' item of the first control item 623 and the 'on' items of the second control items 632, 642, 652 and 662 from among the items thereof by a drag and drop method, the TV 60 may be set up so that when a door open is detected at the door sensor, the first to fourth temperature sensors are operated. At this time, the first to fourth temperature sensors may adjust temperatures of corresponding rooms to preset temperatures, respectively.

As described above, according to the exemplary embodiment, the TV may display the icons of the plurality of electronic devices, which are paired with the TV, on the GUI and may be set up to connect the one electronic device and the plurality of other electronic devices in operation, by the user inputs on the icons of the plurality of electronic devices.

Figure 7:
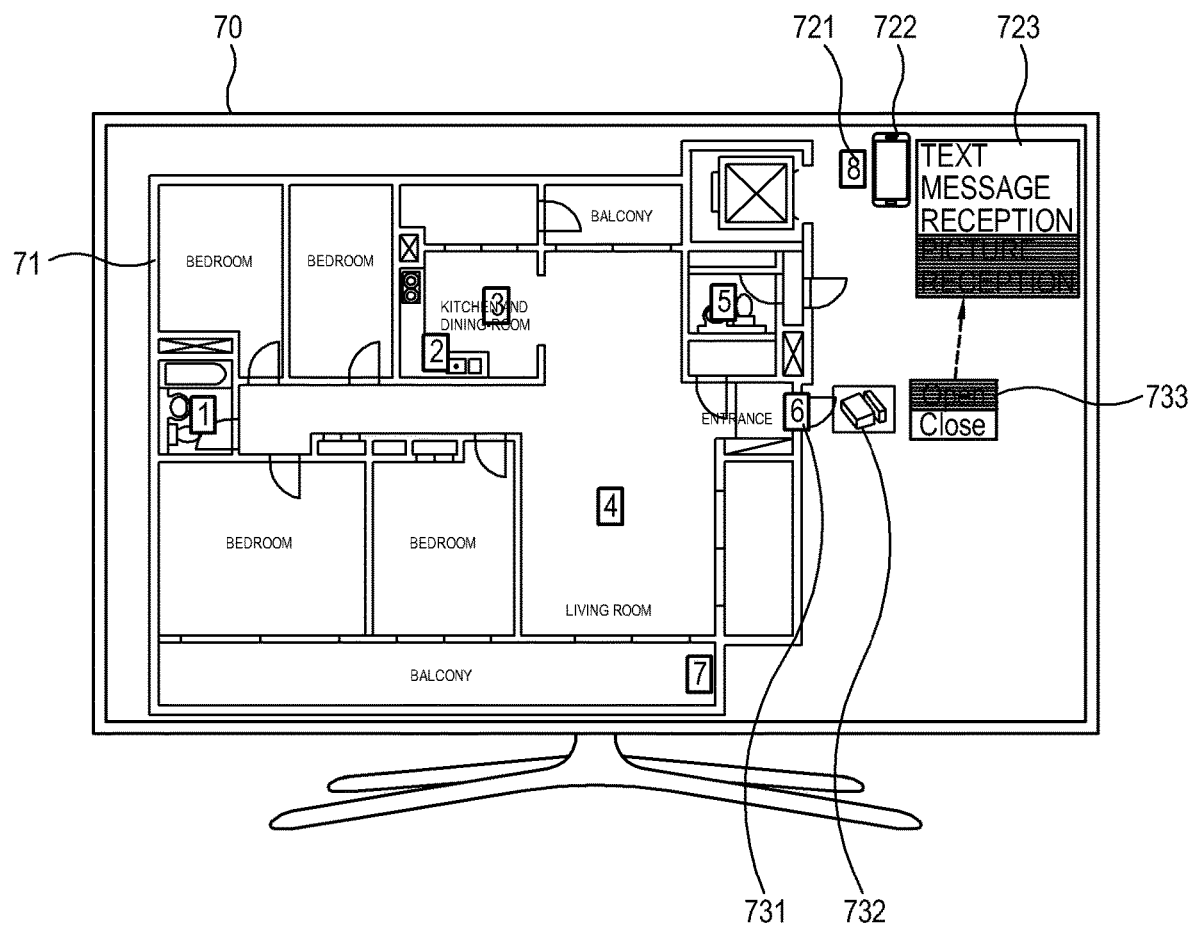
FIG. 7 illustrates an example of performing a setting for connecting an electronic device and a user terminal in operation according to an exemplary embodiment.

FIG. 7 illustrates an example of performing a setting for connecting an electronic device and a user terminal in operation according to an exemplary embodiment. As illustrated in FIG. 7, a TV 70 may display an image map 71, which indicates the internal structure of a house, on the screen, and display a plurality of electronic devices, which has been previously paired with the TV 70, as icons on the displayed image map 71. Also, the user may display an icon 721 of a smart phone, which is designated by the user, separate from the icons of the plurality of electronic devices displayed on the image map 71. At this time, the TV 70 may indicate paired states with a preset color or the like in regard to icons 731 and 721 of a door sensor and the smart telephone, which are currently paired with the TV 70, from among the plurality of icons displayed on the image map 71. Also, the TV 70 may display pictures or graphic images 732 and 722, which indicate types of the door sensor and the smart phone, together with the icons 731 and 721 thereof.

In an exemplary embodiment, the TV 70 may display a first control item 733 capable of setting up an operation of the door sensor and a second control item 723 capable of setting up an operation of the smart phone, in regard to the icons 731 and 721 of the door sensor and the smart phone, which are paired with the TV 70, respectively. As an example, the first control item 733 of the door sensor may include an 'open' item and a 'close' item, and the second control item 723 of the smart phone may include a 'text message reception' item and a 'picture reception' item.

In an exemplary embodiment, the TV 70 may connect the door sensor and the smart phone in operation, based on user inputs on the first control item 733 of the door sensor and the second control item 723 of the smart phone displayed on the image map TV 71. As an example, if the user connects the 'open' item of the first control item 733 and the 'picture reception' item of the second control item 723 from among the items thereof by a drag and drop method, the TV 70 may be set up so that when a door open is detected at the door sensor, the smart phone of the user receives a picture image photographed by a camera at a position of the entrance door.

As described above, according to the exemplary embodiment, the TV may display the icons of the electronic device and the user terminal designated by the user, which are paired with TV, on the GUI and may be set up to transmit the picture or text message to the user terminal when the event is generated at the electronic device, by the user inputs on the icons of the electronic device and the user terminal.

Figure 8:
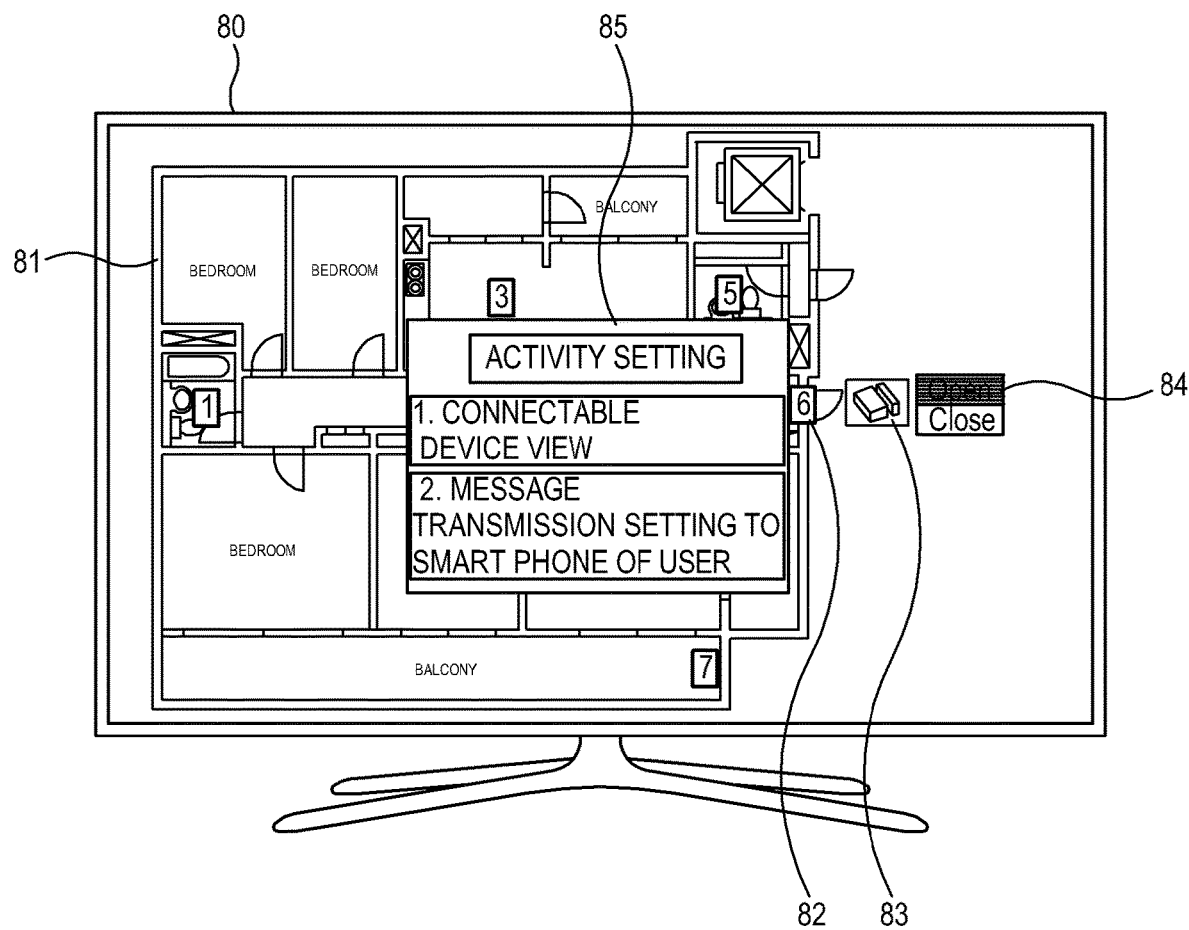
FIG. 8 illustrates an example of displaying a control item for setting up an operation of an electronic device in response to an event of the electronic device according to an exemplary embodiment.

FIG. 8 illustrates an example of displaying a control item for setting up an operation of an electronic device in response to an event of the electronic device according to an exemplary embodiment. As illustrated in FIG. 8, a TV 80 may display an image map 81, which indicates the internal structure of a house, on the screen, and display a plurality of electronic devices, which has been previously paired with the TV 80, as icons on the displayed image map 81. At this time, the TV 80 may indicate a paired state with a preset color or the like in regard to an icon 82 of a door sensor, which is currently paired with the TV 80, from among the plurality of icons displayed on the image map 81. Also, the TV 80 may display a picture or graphic image 83, which indicate a type of the door sensor, together with the icon 82 thereof.

In an exemplary embodiment, the TV 80 may display a control item 84 capable of setting up an operation of the door sensor, in regard to the icon 82 of the door sensor, which are paired with the TV 80. As an example, the control item 84 of the door sensor may include an 'open' item and a 'close' item.

In an exemplary embodiment, the TV 80 may display an activity control item 85 capable of setting up an activity to an item selected from among the control item 84. As an example, if the user selects the 'open' item from among the control item 84 of the door sensor, the TV 80 may display the activity control item 85 as a user interface for setting up an activity corresponding to the selected 'open' item. The activity control item 85 may include items, such as 'connectable device view' item, 'massage transmission setting to smart phone of user' item and the like. In other words, if a door open is detected at the door sensor, the TV 80 may be set to control an operation of a device selected by the user from among the connectable devices or to transmit a message to the selected smart phone of the user.

As described above, according to the exemplary embodiment, the TV may display the icon of the paired electronic device on the GUI and may be set up the activity corresponding to an event when the event is generated at the paired electronic device, by the user input on the icons of the paired electronic device.

Figure 9:
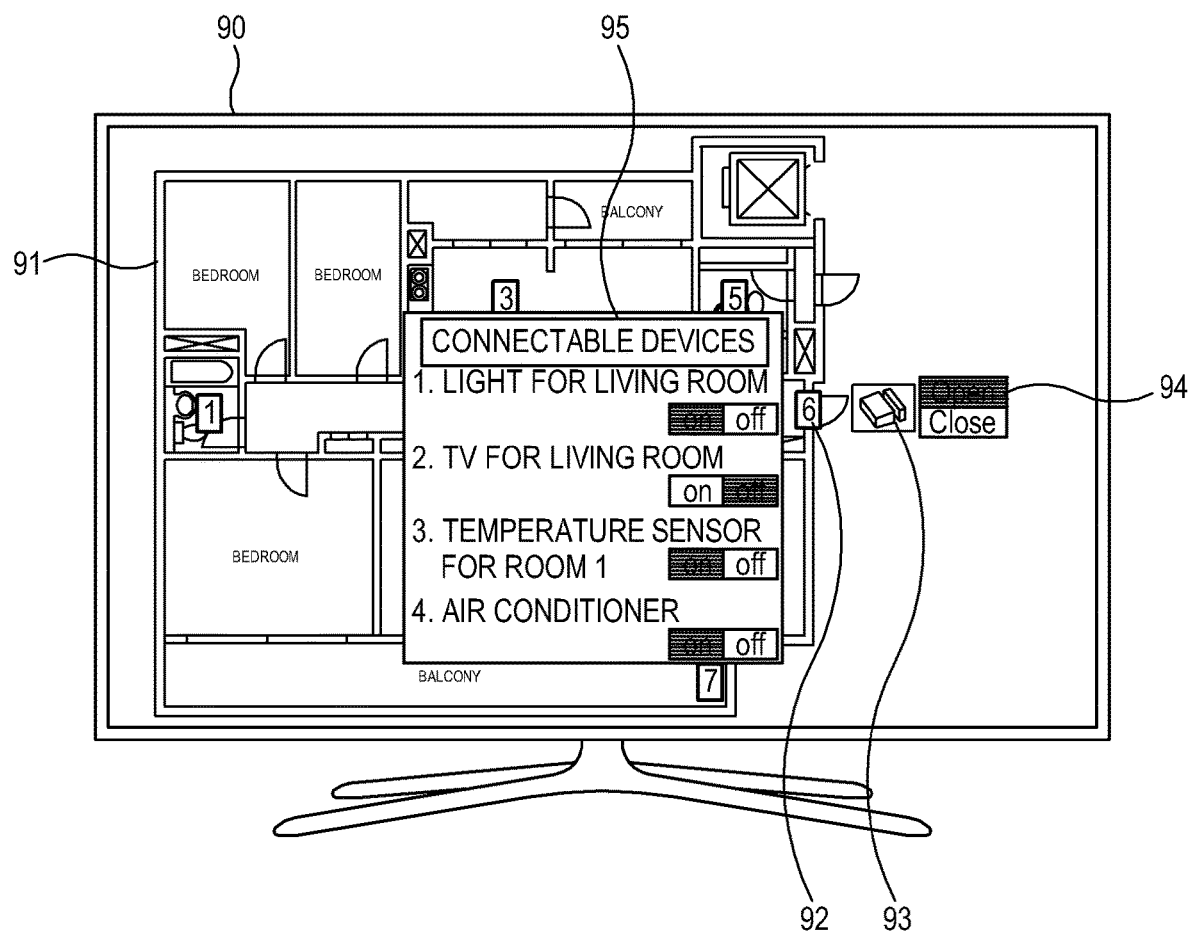
FIG. 9 illustrates an example of displaying a control item for setting up an operation of an electronic device in response to an event of the electronic device according to an exemplary embodiment.

FIG. 9 illustrates an example of displaying a control item for setting up an operation of an electronic device in response to an event of the electronic device according to an exemplary embodiment As illustrated in FIG. 9, a TV 90 may display an image map 91, which indicates the internal structure of a house, on the screen, and display a plurality of electronic devices, which has been previously paired with the TV 90, as icons on the displayed image map 91. At this time, the TV 90 may display a control item 94 capable of setting up an operation of the door sensor, and corresponding to an icon 92 of the door sensor, which are currently paired with the TV 90, from among the plurality of icons displayed on the image map 91. As an example, the control item 94 of the door sensor may include an 'open' item and a 'close' item.

In an exemplary embodiment, the TV 90 may display an activity control item 95 capable of setting up an activity to an item selected from among the control item 94. As an example, if the user selects the 'open' item from among the control item 94 of the door sensor, the TV 90 may display the activity control item 95 as a user interface for setting up an activity corresponding to the selected 'open' item. The activity control item 95 may include items, for example, for setting up operations to respective connectable devices. As an example, with the activity control item 95, if a door open is detected at the door sensor, the TV 90 may be set up to turn on a light for living room, a temperature sensor for room 1 and an air conditioner and to turn off a TV for living room.

Figure 10:
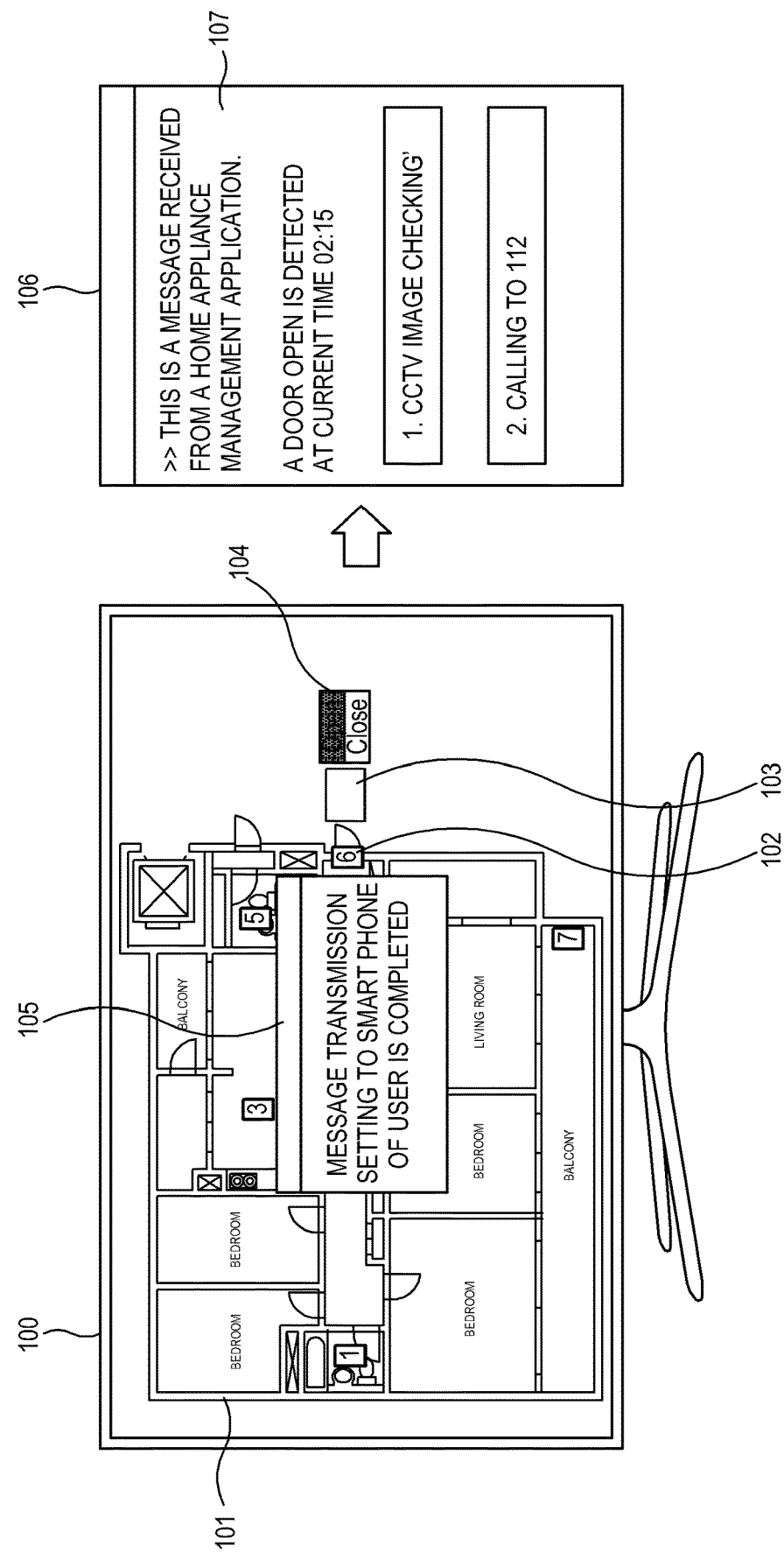
FIG. 10 illustrates an example of transmitting a notification to a user terminal in response to an event of an electronic device according to an exemplary embodiment.

FIG. 10 illustrates an example of transmitting a notification to a user device in response to an event of an electronic device according to an exemplary embodiment. As illustrated in FIG. 10, a TV 100 may display an image map 101, which indicates the internal structure of a house, on the screen, and display a plurality of electronic devices, which has been previously paired with the TV 100, as icons on the displayed image map 101. At this time, the TV 100 may display a control item 104 capable of setting up an operation of a door sensor, and corresponding to an icon 102 of the door sensor, which are currently paired with the TV 100, from among the plurality of icons displayed on the image map 101. As an example, the control item 104 of the door sensor may include an 'open' item and a 'close' item.

In an exemplary embodiment, the TV 100 may display an activity control item 105 capable of setting up an activity to an item selected from among the control item 104. As an example, if the user selects the 'open' item from among the control item 104 of the door sensor, the TV 100 may display the activity control item 105 as a user interface for setting up an activity corresponding to the selected 'open' item. The activity control item 105 may include items, for example, for setting up a message transmission to a smart phone of the user and the like. As an example, with the activity control item 105, if a door open is detected at the door sensor, the TV 100 may be set up to transmit a message for informing the user of a state where the door open is detected by the door sensor to the smart phone 106 of the user.

For instance, if the TV 100 transmits the state where the door open is detected by the door sensor to the smart phone 106 of the user, the smart phone 106 may display that the message saying that the door open is detected is received from a home appliance management application of the TV 100. Also, the smart phone 106 may display items, such as 'CCTV image checking' item, 'calling to 112' item, and the like, to allow the user to take action against the door open.

Figure 11:
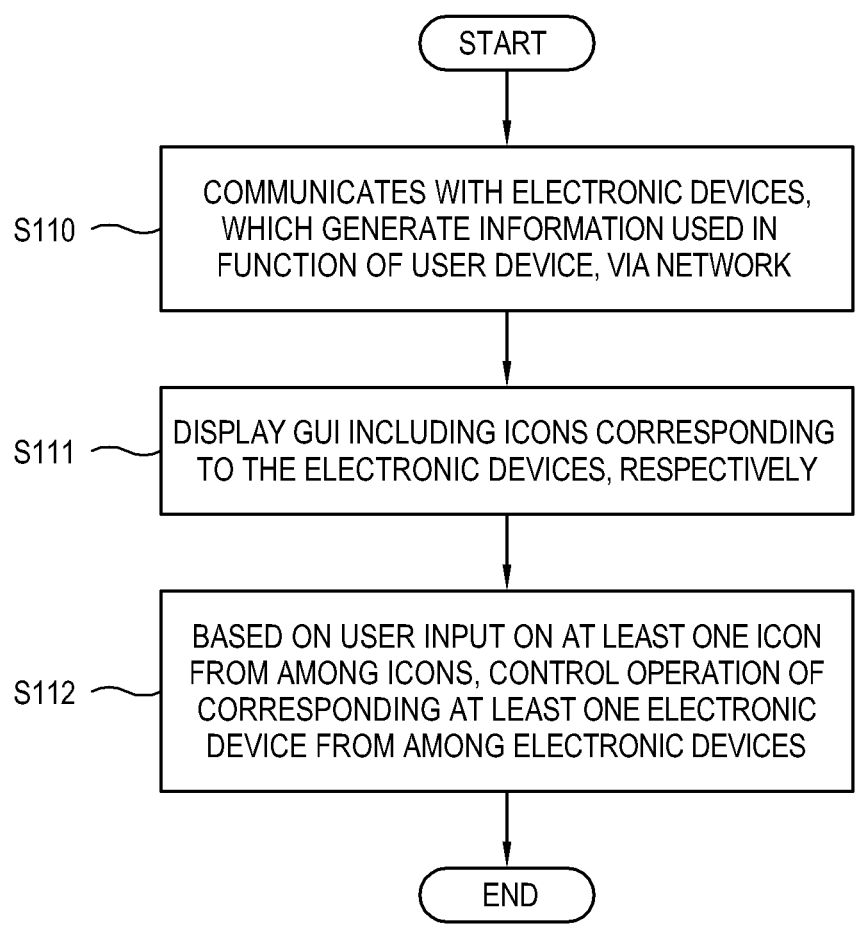
FIG. 11 is a flow chart illustrating a control method of a display apparatus according to an exemplary embodiment.

FIG. 11 is a flow chart illustrating a control method of a display apparatus according to an exemplary embodiment. As illustrated in FIG. 11, at an operation S110, the display apparatus communicates with a plurality of electronic devices, which generates information used in a function of a user device, via the network. At an operation S111, the display apparatus displays a GUI including a plurality of icons corresponding to the plurality of electronic devices, respectively. Here, the GUI may further include an image indicating places in which the plurality of electronic devices is provided, and the plurality of icons corresponding to the plurality of electronic devices, respectively, may be placed at positions in which the plurality of electronic devices is respectively provided on the image. At this time, at least a portion of the image may be generated or changed according to a user input.

In an exemplary embodiment, at the operation S111, the display apparatus may display at least one icon corresponding to at least one electronic device in response to the at least one electronic device being paired via the communicator. Also, at the operation S111, the display apparatus may receive device information from at least one electronic device from among the plurality of electronic devices via the communicator, and display an image corresponding to the at least one icon based on the received device information.

Lastly, at an operation S112, based on a user input on at least one icon from among the plurality of icons, the display apparatus may control an operation of corresponding at least one electronic device from among the plurality of electronic devices.

Figure 12:
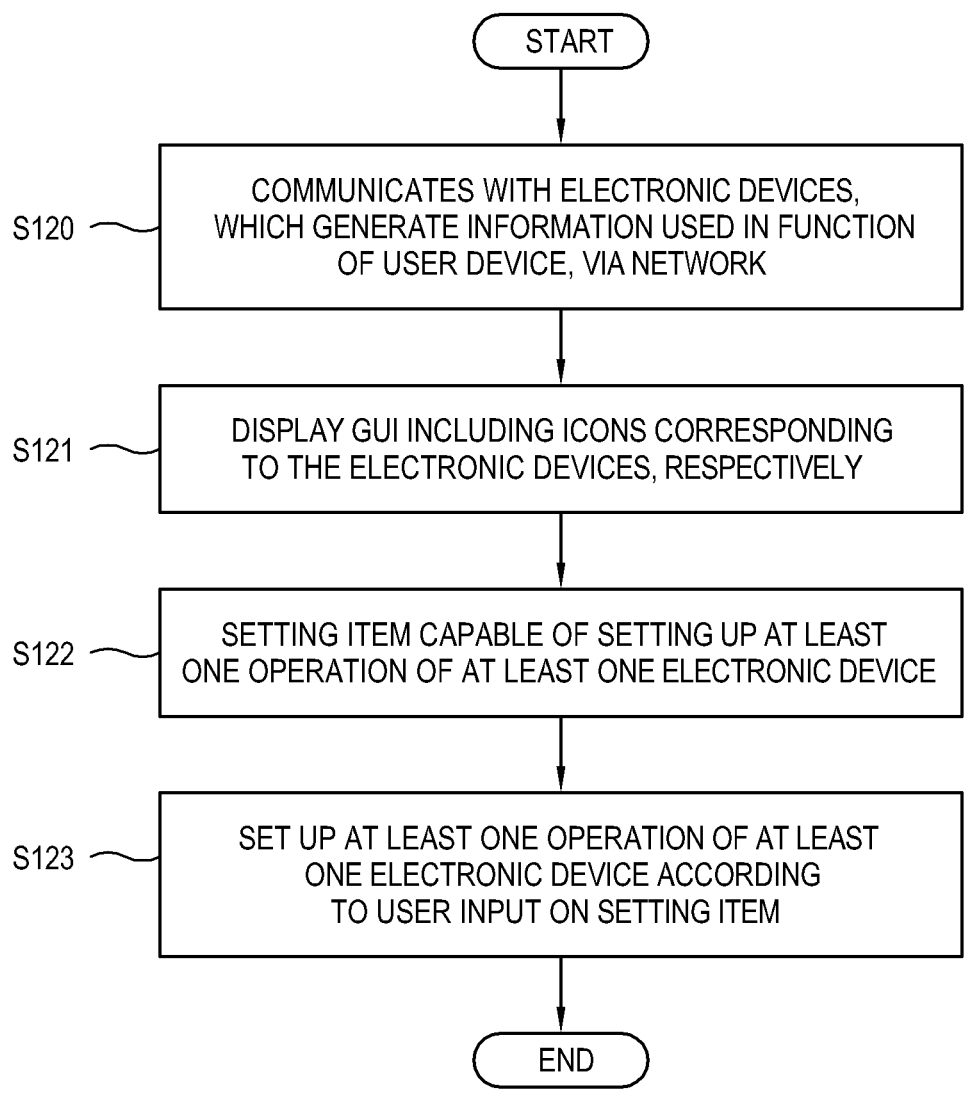
FIG. 12 is a flow chart illustrating a control method of a display apparatus according to an exemplary embodiment.

FIG. 12 is a flow chart illustrating a control method of a display apparatus according to an exemplary embodiment. As illustrated in FIG. 12, at an operation S120, the display apparatus communicates with a plurality of electronic devices, which generates information used in a function of a user device, via the network. At an operation S121, the display apparatus displays a GUI including a plurality of icons corresponding to the plurality of electronic devices, respectively. In an exemplary embodiment, at the operation S121, the display apparatus may display at least one icon corresponding to at least one electronic device in response to the at least one electronic device being paired via the communicator. Also, at the operation S121, the display apparatus may receive device information from at least one electronic device from among the plurality of electronic devices via the communicator, and display an image corresponding to the at least one icon based on the received device information.

At an operation S122, the display apparatus displays a control item capable of setting up at least one operation of at least one electronic device. At this time, the control item may be displayed based on device information received from the at least one electronic device via the communicator. Lastly, at an operation S123, the display apparatus sets up the at least one operation of the at least one electronic device according to a user input on the control item. In an exemplary embodiment, the display apparatus displays may further receive state information from the at least one electronic device during which the at least one operation is set up via the communicator, and display information on result state of the setting based on the received state information.

FIG. 13 is a flow chart illustrating a control method of a display apparatus according to an exemplary embodiment. As illustrated in FIG. 13, at an operation S130, the display apparatus communicates with a plurality of electronic devices, which generates information used in a function of a user device, via the network. At an operation S131, the display apparatus displays a GUI including a plurality of icons corresponding to the plurality of electronic devices, respectively. Here, the GUI may further include an image indicating places in which the plurality of electronic devices is provided, and the plurality of icons corresponding to the plurality of electronic devices, respectively, may be placed at positions in which the plurality of electronic devices is respectively provided on the image. At this time, at least a portion of the image may be generated or changed according to a user input.

In an exemplary embodiment, at the operation S131, the display apparatus may display the at least one icon corresponding to at least one electronic device in response to the at least one electronic device being paired via the communicator. Also, at the operation S131, the display apparatus may receive device information from at least one electronic device from among the plurality of electronic devices via the communicator, and display an image corresponding to the at least one icon based on the received device information.

At an operation S132, the display apparatus displays a first control item corresponding to a first electronic device and a second control item corresponding to a second electronic device from among the plurality of electronic devices. Lastly, at an operation S133, the display apparatus connects the first electronic device and the second electronic device in operation, based on user inputs on the first control item and the second control item.

As described above, the display apparatus according to the exemplary embodiments may provide provides the GUI for controlling the plurality of electronic devices, thereby enabling the user to control the electronic devices in an intuitive and convenient way. Also, the display apparatus according to the exemplary embodiments may connect the plurality of electronic devices in operation by selecting the plurality of control items of the plurality of electronic devices displayed on the GUI.

While the exemplary embodiments have been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus, comprising:
   a display;
   a communicator including circuitry configured to communicate with a plurality of electronic devices via a network;
   a user input receiver including circuitry configured to receive a user input;
   a memory storing instructions; and
   a processor that executes the instructions to cause the display apparatus to:
      display a graphic user interface (GUI) screen based on an image which is stored in the memory and is set to be used for the GUI screen, the GUI screen including a plurality of icons, each of the plurality of icons corresponding to each of the plurality of electronic devices including a first electronic device and a second electronic device,
      display first control items which correspond to respectively first operations supported by the first electronic device and are configured to receive an input to control the first operations, and a second control items which correspond to respectively second operations supported by the second electronic device and are configured to receive an input to control the second operations, the first control items and the second control items being displayed simultaneously on the GUI screen,
      while the first control items and the second control items are displayed simultaneously on the GUI screen, in response to a user input for connecting a first control item of the first control items with a second control item of the second control items through selection of the first control item and the second control item, generate connection information for a connection between one of the first operations supported by the first electronic device and one of the second operations supported by the second electronic device, and
      in response to one of the first operations indicated by the connection information being performed in the first electronic device, control the second electronic device to perform one of the second operations which is connected to the performed one of the first operations, based on the connection information.

2. The apparatus according to claim 1, wherein the processor executes the instructions to cause the display apparatus to:
   display at least one of a first icon corresponding to the first electronic device and a second icon corresponding to the second electronic device in response to the first electronic device and the second electronic apparatus being paired via the communicator.

3. The apparatus according to claim 1, wherein the processor executes the instructions to cause the display apparatus to:
   receive device information from at least one of the first electronic device and the second electronic device via the communicator, and
   display at least one of a first icon and a second icon based on the received device information.

4. The apparatus according to claim 1, wherein the processor executes the instructions to cause the display apparatus to:
   select the image among a plurality of images stored in the memory to generate the GUI screen for a mode of internet of things (IOT).

5. The apparatus according to claim 4, wherein the processor executes the instructions to cause the display apparatus to:
   generate the GUI screen for the mode of IOT by incorporating at least one of a first icon corresponding to the first electronic device and a second icon corresponding to the second electronic device among the plurality of icons.

6. The apparatus according to claim 4, wherein the processor executes the instructions to cause the display apparatus to:
   move at least one icon among the plurality of icons in the GUI screen for the mode of IOT by a user command, and
   in response to a command for storing after moving of the at least one icon, store the GUI screen for the mode of IOT.

7. The apparatus according to claim 4, wherein the processor executes the instructions to cause the display apparatus to:
   receive state information from at least the first electronic device and the second electronic device during the control of the second electronic device to perform the connected one of the second operations via the communicator, and
   display information resulting from the received state information.

8. The apparatus according to claim 1, wherein the processor executes the instructions to cause the display apparatus to:
   acquire an image of at least a first icon and a second icon through an internet search based on an identification information of the first electronic device and an identification information of the second electronic device.

9. The apparatus according to claim 1, wherein at least the first control item are configured based on information received from the first electronic device via the communicator.

10. The apparatus according to claim 1, wherein the processor executes the instructions to cause the display apparatus to:
the one of the first control item and the one of the second control item are connected based on user inputs associated with the first control item of the first electronic device among the plurality of electronic devices and the second control item of the a second electronic device among the plurality of electronic devices.

11. The apparatus according to claim 1, wherein the processor executes the instructions to cause the display apparatus to:
generate or change at least a portion of the image according to the user input.

12. The apparatus according to claim 1, wherein the processor is configured to generate the connection information in response to receiving the user input which drags the first control item and drops the first control item onto the second control item.

13. A control method of a display apparatus comprising:
communicating a plurality of electronic devices via a network;
displaying a graphic user interface (GUI) screen based on an image which is stored in a memory and is set to be used for the GUI screen, the GUI screen including a plurality of icons, each of the icons corresponding to each of the plurality of electronic devices including a first electronic device and a second electronic device;
displaying first control items which correspond to respectively first operations supported by the first electronic device and are configured to receive an input to control the first operations, and second control items which correspond to respectively second operations supported by the second electronic device and are configured to receive an input to control the second operations, the first control items and the second control items being displayed simultaneously on the GUI screen,
while the first control items and the second control items are displayed simultaneously on the GUI screen, in response to a user input for connecting a first control item of the first control items with a second control item of the second control items through selection of the first control item and the second control item, generating connection information for a connection between one of the first operations supported by the first electronic device and one of the second operations supported by the second electronic device, and
in response to one of the first operations indicated by the connection information being performed in the first electronic device, control the second electronic device to perform one of the second operations which is connected to the performed one of the first operations, based on the connection information.

14. The method according to claim 13, further comprising:
displaying at least a first icon corresponding to the first electronic device and a second icon corresponding to the second electronic device in response to the first electronic device and the second electronic apparatus being paired via a communicator including circuitry.

15. The method according to claim 13, further comprising:
receiving device information from at least one of the first electronic device and the second electronic device via a communicator including circuitry, and
displaying at least one of a first icon and a second icon based on the received device information.

16. The method according to claim 13, further comprising:
selecting the image among a plurality of images stored in the memory to generate the GUI screen for a mode of internet of things (IOT).

17. The method according to claim 16, further comprising:
generating the GUI screen for the mode of IOT by incorporating at least one of a first icon corresponding to the first electronic device and a second icon corresponding to the second electronic device among the plurality of icons.

18. The method according to claim 16, further comprising:
moving at least one icon among the plurality of icons in the GUI screen for the mode of IOT by a user command; and
in response to a command for storing after moving of the at least one icon, storing the GUI screen for the mode of IOT.

19. The method according to claim 13, further comprising:
acquiring an image of at least one of a first icon and a second icon through an internet search based on an identification information of at least one of the first electronic device and the second electronic device.

20. The method according to claim 13, wherein at least one of the first control item and the second control item are configured based on information received from at least the first electronic device and the second electronic device via a communicator including circuitry.

* * * * *